(12) United States Patent
Malone et al.

(10) Patent No.: US 7,763,155 B2
(45) Date of Patent: Jul. 27, 2010

(54) ELECTRO-OSMOTIC PULSE (EOP) SYSTEM FOR DE-WATERING AROUND MANMADE STRUCTURES AND METHOD OF USE THEREFOR

(75) Inventors: Philip G. Malone, Vicksburg, MS (US); Charles A. Weiss, Jr., Clinton, MS (US); Orange S. Marshall, Champaign, IL (US); Michael K. McInerney, Champaign, IL (US); Vincent F. Hock, Jr., Mahomet, IL (US); Charles P. Marsh, Urbana, IL (US); Sean W. Morefield, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1398 days.

(21) Appl. No.: 11/141,509

(22) Filed: Jun. 1, 2005

(65) Prior Publication Data
US 2005/0252775 A1  Nov. 17, 2005

Related U.S. Application Data

(63) Continuation-in-part of application No. 10/140,875, filed on May 9, 2002, now Pat. No. 6,919,005.

(51) Int. Cl.
*E02D 19/00* (2006.01)
(52) U.S. Cl. .................. 204/515; 204/230.2; 204/230.6
(58) Field of Classification Search .................. 204/515, 204/230.2, 230.6
See application file for complete search history.

(56) References Cited

U.S. PATENT DOCUMENTS

| 3,070,528 A | * | 12/1962 | Lipcsey et al. | ............... 204/515 |
| 3,856,646 A | * | 12/1974 | Morarau | ..................... 204/515 |
| 5,296,120 A | * | 3/1994 | Bennett et al. | ......... 204/196.33 |
| 6,117,295 A | * | 9/2000 | Bjerke et al. | ................ 204/515 |

* cited by examiner

Primary Examiner—Arun S Phasge
(74) Attorney, Agent, or Firm—Earl H. Baugher, Jr.

(57) ABSTRACT

An Electro-Osmotic Pulse (EOP) system is used to dewater structure, both natural and manmade. Preferably, the system employs durable, dimensionally stable anodes affixed to structure in a configuration designed to maximize electrical contact with the structure and minimize electrode gas generation. The anodes and cathodes are attached to a DC power supply that provides a voltage potential between them. DC power is cycled until the structure has been sufficiently treated. Select embodiments employ perforated metal pipes as cathodes for the purpose of transport and drainage of fluids. In select embodiments of the present invention, the cathodes are connected to variable resistors designed to reduce opportunity for corrosion of buried metal objects in the vicinity of the EOP system. Select embodiments employ a pre-specified pulse train of DC voltage pulses to migrate water from under a crawl space while moving available cations in the soil. Select embodiments also protect large structures such as concrete dams.

12 Claims, 7 Drawing Sheets

ELECTRO-OSMOTIC PULSE (EOP) SYSTEM FOR DE-WATERING AROUND MANMADE STRUCTURES AND METHOD OF USE THEREFOR

RELATED INVENTIONS

Under 35 U.S.C §121, this application is a continuation-in-part of, and claims the benefit of, prior application Ser. No. 10,140,875, filed May 9, 2002, now U.S. Pat. No. 6,919,005 B2 Configuration and Electro-Osmotic Pulse (EOP) Treatment for Degrading Porous Material, by McInerney et al., Jul. 19, 2005, and is incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

Groundwater under or adjacent a structure's foundation can cause serious damage. In addition to increased concrete deterioration and accelerated rebar corrosion of structure such as walls and pilings, internal dampness and resultant high humidity accelerates corrosion of expensive electrical and mechanical equipment, such as what may be placed within a dam or in a crawl space beneath a building and can increase maintenance requirements through frequent repainting or cleaning to combat mold and mildew growth. Furthermore, the intruding water raises the relative humidity thereby accelerating the corrosion rate of mechanical equipment in the area and creating unacceptable air quality, for example, in any air drawn from above a crawl space into a building. This air pollution carries concomitant health problems due to the rapid growth of bacteria and mold.

In selective problem areas, the usual approach to the treatment of water intrusion problems is to "trench and drain." In other words, to excavate and expose a piling area or the base of a foundation and to install a drain tile system around the manmade structure or affected area. Other areas, such as floors, are untreatable using conventional methods.

Electro-osmosis has origins in 1809, when F. F. Reuss originally described an experiment demonstrating that water could be forced to flow through a clay-water system when an external electric field was applied to it. Research since then has shown that water surrounding cations moves with them, the flow initiated by the predominant movement of cations present in the pore fluid of porous media such as a clay, concrete, concrete block, brick, cementitious construction materials, or the like. The basic physics and chemistry of electro-osmosis can be found in several textbooks and treatises. Glasstone, S., *Textbook of Physical Chemistry*, 2d ed., D. Van Nostrand Company, Inc., Princeton, N.J., 1946. Tikhomolova, K. P., *Electro-Osmosis*, Ellis Horwood Limited, Chichester, West Sussex, England, 1993.

Electro-osmosis is typically used to solve the problem of groundwater intrusion, which can cause serious damage to a structure's foundation and interior. Electro-Osmotic Pulse (EOP) technology typically offers an alternative that addresses moisture problems from the interior of affected areas without the cost of excavation. Examples of such systems are described below.

In one system, humidity is removed from a damp structure by positioning electrodes within the structure and applying a DC voltage across them. U.S. Pat. No. 3,856,646, Methods and Electrodes for the Drying of Damp Buildings, to Morarau, Dec. 24, 1974.

In another system, chloride ions are removed from concrete by embedding an anode in an electrolyte and establishing an electric current between the anode and the concrete structure in order to avoid corrosion of the concrete's reinforcing means, typically steel rebar. U.S. Pat. No. 5,296,120, Apparatus for the Removal of Chloride from Reinforced Concrete Structures, to Bennett et al., Mar. 22, 1994.

Another system discloses a process for changing the bond strength between concrete and its steel reinforcement by passing DC current through the concrete. U.S. Pat. No. 5,312,526, Method for Increasing or Decreasing Bond Strength Between Concrete and Embedded Steel, and for Sealing the Concrete-to-Steel Interface, to Miller, May 17, 1994.

Still another method used to eliminate humidity from concrete uses electro-osmosis to pass current pulses in a predetermined pattern through the concrete. U.S. Pat. No. 5,368,709, Method and Apparatus for Controlling the Relative Humidity in Concrete and Masonry Structures, to Utklev, Nov. 29, 1994.

A method that claims improvement over existing methods by choice of a narrow range of relationships among the three pulse durations of the pulse train provides longer anode life while optimizing the process of dehydration. U.S. Pat. No. 5,755,945, Method for Dehydrating Capillary Materials, to Kristiansen, May 26, 1998.

An improvement over previous methods claims to increase anode life while optimizing dehydration and the time to effect it. It uses a specific pulse train in which the positive pulse width is much greater than the negative pulse width that is, in turn, greater than the off period. U.S. Pat. No. 6,117,295, Method for Dehydrating a Porous Material, to Bjerke, Sep. 12, 2000.

A method that claims to be an improvement over the '709 patent provides a control unit to control the pulse width of individual pulses by monitoring characteristics of the energizing source. U.S. Pat. No. 6,126,802, Method and Device for Regulating and Optimizing Transport of Humidity by Means of Electroosmosis, to Utklev, Oct. 3, 2000.

A more recent patent proposes a solution to overcome the disadvantage of the '709 patent when used to dehumidify steel-reinforced structures. It specifically prevents the deterioration of the reinforcing steel by providing a second voltage to the reinforcement steel in addition to the typical electro-osmosis configuration of the '709 patent and its predecessors. U.S. Pat. No. 6,370,643 B1, Method for Effecting Fluid Flow in Porous Materials, to Finnebraaten, Aug. 7, 2001.

In a conventional method, an Electro-Osmotic Pulse (EOP) system is configured by installing anodes (positive electrodes) in the interior wall, floor or ceiling of the structure and cathodes (negative electrodes) in the soil exterior to the structure. Due to the extreme electrochemical environment surrounding the anode, special material and geometry requirements may be placed on an anode intended to be used for other than "trickle current" loads or for extended periods, or both.

Durable, dimensionally stable anodes are a recent development in anode technology. U.S. Pat. No. 5,055,169, to Hock et al., Method of Making Mixed Metal Oxide Coated Substrates, Oct. 8, 1991, describes a reactive ion plating process using RF, specifically identifying the rate of evaporation of a noble metal such as ruthenium or iridium, the rate of evaporation of a valve metal such as titanium, and the partial oxygen pressure needed to produce an electrically conductive mixed metal oxide ceramic coating on a valve metal substrate. The coated substrate can sustain a current density of 150 A per $m^2$ of exposed coating surface in fresh water electrolyte, preferably for at least 20 hours, and more preferably for at least 75 hours, without an excessive increase in the voltage level required to maintain that current density. As noted in the '169 patent abstract, these anodes have excellent characteristics to include: low resistivity, very low dissolution rates, long life, excellent durability, and excellent corrosion resistance. Durable, dimensionally stable anodes are also referred to as semiconductive anodes. Durable anodes that are classified as dimensionally stable generally consist of a valve metal substrate such as niobium, tantalum, titanium or alloys thereof, with a catalytic coating consisting of precious metal (s), most often from the platinum metal group, and often in oxide form in combination with valve metal oxides as a mixed metal oxide.

DETAILED DESCRIPTION

Figure 1:
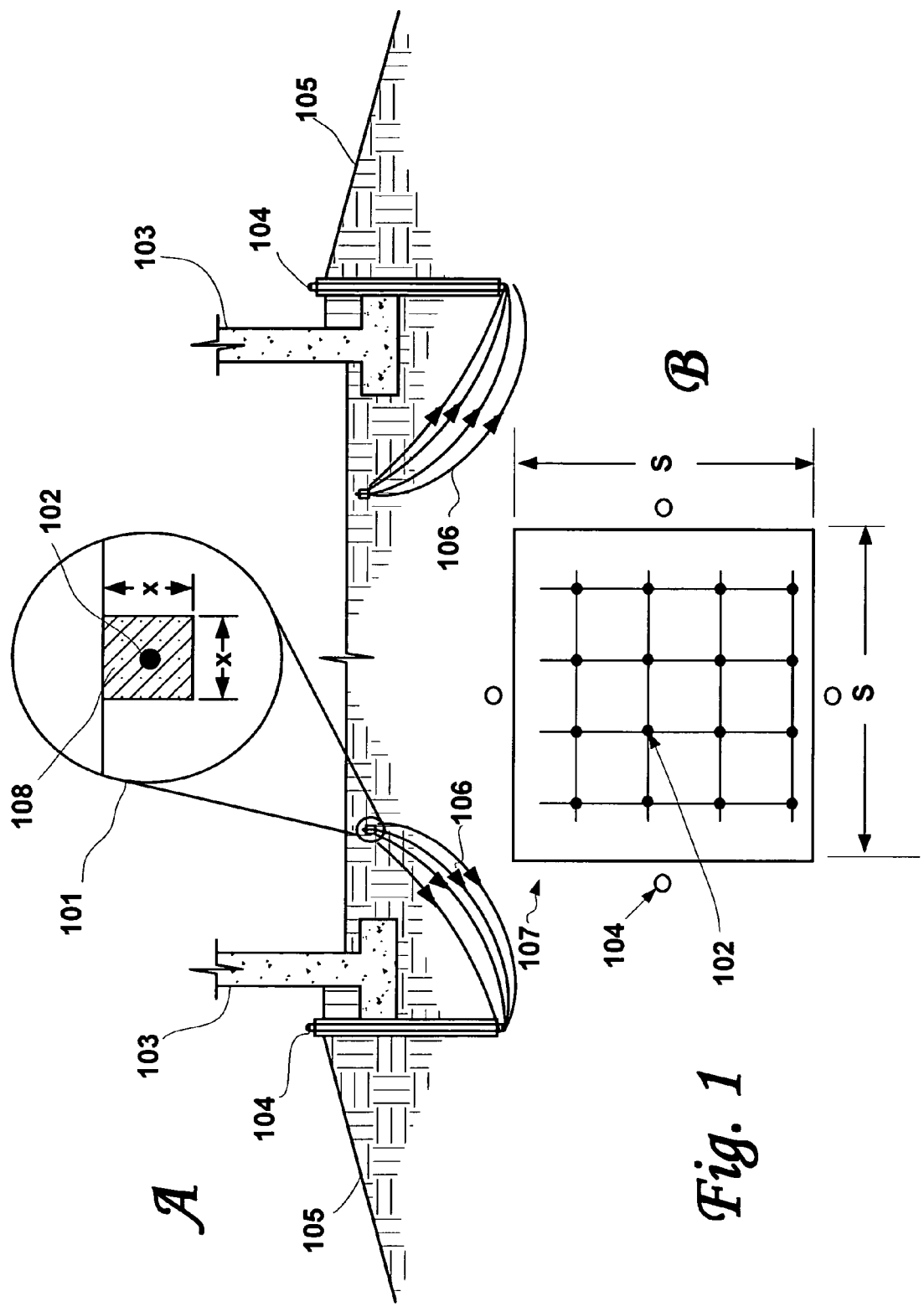
FIG. 1 is a schematic diagram of elements, including arrays of anode electrodes, as used in select embodiments of the present invention.

A system and method is provided for de-watering uniquely defined volumes desirable to be kept relatively dry. In select embodiments of the present invention, the system comprises durable dimensionally stable anodes; one or more cathodes embedded in natural structure external to the volume to be protected; and circuitry connecting the anodes, cathodes and other objects to be protected, such that the circuitry facilitates establishing a voltage differential between the anodes and cathodes. In select embodiments of the present invention, the circuitry also includes means for improving corrosion resistance of metallic objects. Select embodiments employ a pre-specified pulse train of DC voltage pulses, that may be variable in voltage, to migrate water from protected volumes while moving available dissolved cations. Note that as water is removed and the medium becomes drier, the resistance of the medium increases, resulting in reduced current flow and concomitant reduction in power requirements.

In select embodiments of the present invention, a system is provided for de-watering soil under a crawlspace defined by the perimeter of a foundation while protecting buried metal objects proximate the system. In select embodiments of the present invention, the system comprises an array of durable dimensionally stable anodes embedded in soil; one or more cathodes embedded in soil external to the crawlspace; and circuitry connecting the anodes, cathodes and metallic objects, such that the circuitry facilitates establishing a voltage differential between the anodes and cathodes and the circuitry includes means for protecting the metallic objects. Select embodiments employ a pre-specified pulse train of DC voltage pulses to migrate water from under the crawl space while moving available cations in the soil.

In select embodiments of the present invention, the array of anodes is embedded in soil within the crawlspace. In select embodiments of the present invention, the anodes are embedded in soil external to the crawlspace and between the foundation and the cathodes. In select embodiments of the present invention, the anodes are ceramic coated wires. In select embodiments of the present invention, the anodes are canister anodes.

In select embodiments of the present invention, the anodes are buried in a trench that is backfilled with carbon and bentonite clay. In select embodiments of the present invention, the carbon is selected from the group consisting essentially of powdered graphite, coke breeze, carbon black, and combinations thereof.

In select embodiments of the present invention, the cathodes are metal rods. In select embodiments of the present invention, the cathodes are perforated metal pipes. In select embodiments of the present invention, the perforated pipes are wrapped with one or more water permeable geotextiles.

In select embodiments of the present invention, the circuitry comprises one or more variable resistors connected to one or more metallic objects and sufficient wiring and connectors to connect the resistors, metallic objects, anodes and cathodes in the circuitry. In select embodiments of the present invention, a DC power supply is connected to the circuitry.

In select embodiments of the present invention, a method is provided for de-watering soil under a crawlspace defined by the perimeter of a foundation while reducing opportunity for corroding buried metal objects proximate the EOP system used with the method. The method comprises: performing a resistivity test on the soil; providing an array of durable dimensionally stable anodes embedded in soil; providing at least one cathode embedded in soil external to the crawlspace; providing circuitry to the anodes, cathodes and metallic objects; and energizing the circuitry to establish a voltage differential between the anodes and cathodes and to reduce opportunity for corrosion of the metallic objects.

In select embodiments of the present invention, the method embeds the anodes in soil within the crawlspace. In select embodiments of the present invention, the method embeds the anodes in soil external to the crawlspace, between the foundation and the cathodes. In select embodiments of the present invention, the method provides the anodes as ceramic coated wires. In select embodiments of the present invention, the method provides the anodes as canister anodes.

In select embodiments of the present invention, the method provides for burying the anodes in a trench, the trench filled with backfill comprising carbon and bentonite clay.

In select embodiments of the present invention, the method provides the cathodes as metal rods. In select embodiments of the present invention, the method provides the cathodes as perforated metal pipes. In select embodiments of the present invention, the method provides the perforated pipes wrapped with one or more water permeable geotextiles.

In select embodiments of the present invention, the method provides one or more variable resistors connected to one or more metallic objects and sufficient wiring and connectors to connect the resistors, metallic objects, anodes and cathodes in the circuitry. In select embodiments of the present invention, the method provides a DC power supply connected to the circuitry.

In select embodiments of the present invention, a system using electrodes 102, 104 (FIG. 1) connected to a pulsed DC power supply 501 (FIG. 5) dewaters soil 105 beneath a structure. The anode electrode 102 is connected to the soil, maximizing electrical contact with the soil 105 while minimizing effects of electrode gas generation. The cathode electrode 104 is connected to the soil 105 outside the structure. In select embodiments, the cathode electrode 104 is supplemented with additional circuitry 502 to reduce the opportunity for corrosion of nearby buried metallic objects. In select embodiments of the present invention, a DC power supply 501 delivers a pulsed signal to effect water migration away from the crawlspace 303 (FIG. 3) while moving available cations in the soil 105.

Refer to FIG. 1. In select embodiments of the present invention, electro-osmosis is facilitated by inserting durable, dimensionally stable anode electrodes (wires) 102, such as the durable dimensionally stable anode wires that may be produced via the process detailed in the '169 patent, into the soil 105 that is under a structure defining a crawl space 303 within the perimeter of its foundation 103. The configuration emplaces cathode electrodes (rods) 104 in the soil 105 directly outside the foundation of that structure. The durable, dimensionally stable anode electrode 102 is embedded in the soil 105 under the structure and the cathode electrode 104, typically a copper-clad steel ground rod, is embedded into the soil 105 outside the foundation 103. As depicted, the cathode electrode 104 may be placed a short distance, e.g., 2 meters, from the foundation 103. Hard wires (FIG. 5) are used to form the circuit containing the durable, dimensionally stable anode electrode 102, the cathode electrode 104 and a DC power supply 501. The number of durable, dimensionally stable anode electrodes 102 and cathode electrodes 104, and placement thereof, may be determined from an initial resistivity test of the soil 105. The objective is to achieve a pre-specified current density to create an electric field strength in the soil 105 sufficient to overcome the force exerted by the hydraulic gradient on the water molecules (not shown separately) enclosed therein. When the system is energized, cations, e.g., Ca++ (not shown separately), and water molecules in the soil flow in the direction of the arrows 106 (FIG. 1) towards the cathode electrodes 104, thus "de-watering" the soil under the crawl space 303.

In select embodiments of the present invention, a DC power supply 501 operates at a constant voltage in the approximate range of 1 to 40 $V_{DC}$. Either pulsed or constant direct current is employed to facilitate movement of fluids. In select embodiments of the present invention that employ alternating polarity pulsed current, the preferable mode employs a signal that is positive with respect to the cathode electrode 104 more than approximately 70% of the cycle. In select embodiments of the present invention, the upper bound on current is maintained in accordance with the current density on the anode electrode 102. For example, the current density is limited to less than approximately 16 mA per linear foot of anode wire of approximately 1.6 mm (1/16 in.) diameter. This design criterion maximizes system life and reduces gas generation at the electrodes.

Refer to FIG. 1, profile A and plan B views of an embodiment of the present invention that dewaters a crawlspace. The installation employs an anode grid 107 in the crawlspace, composed in a preferred embodiment of conductive anode electrodes 102, preferably ceramic coated, and cathode electrodes 104 inserted in the soil 105 outside the building foundation 103.

In select embodiments of the present invention the S X S grid is installed with anode electrodes 102 on approximately one to two meter (three to six foot centers) and with x approximately 7.6 cm (3 in.), depending on soil composition. In select embodiments of the present invention, the cathode electrodes 104 are un-insulated (unwrapped) metal rods, preferably copper. In alternate embodiments of the present invention, the cathode electrodes 104 are wrapped with insulation, having only their tips exposed as shown in FIG. 1. The anode electrode 102 is electrically connected to the soil 105 by burying it in a shallow trench (shown in cross section only at 101 with backfill 108), the backfill 108 preferably consisting of a mix of powdered graphite (coke breeze) and bentonite clay as depicted in the expanded portion 101 of FIG. 1. This backfill 108 insures uniformity of current output while increasing the effective surface area of the anode electrode 102 thereby decreasing current density of the anode's output surface. Bentonite clay absorbs water and helps ensure good electrical conductivity. Carbon is a strong conductor that conforms to geometric variations in both the anode electrode 102 and in the soil 105 surrounding the backfill 108 in the trench. In select embodiments of the present invention, the installed trench is approximately 15-30 cm (six inches to one foot) deep to prevent the anode electrodes 102 and backfill 108 from floating to the surface.

In select embodiments of the present invention, the grid layout 107 may be constructed of long canister anodes (not shown separately) buried horizontally.

Figure 2:
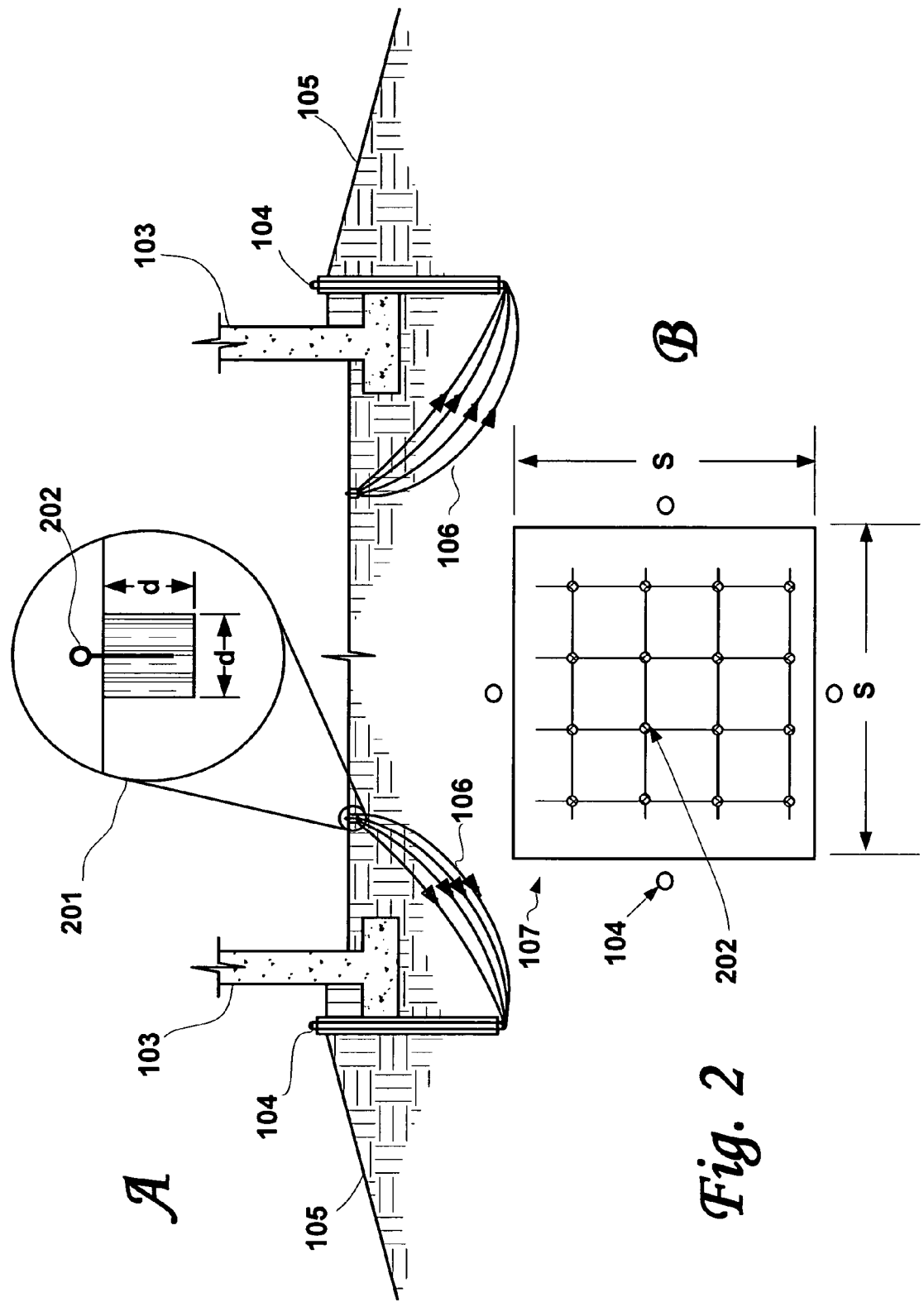
FIG. 2 is an alternate arrangement to FIG. 1 showing a schematic diagram of elements, including arrays of alternate anode electrodes, as used in select embodiments of the present invention.

Refer to FIG. 2, depicting a profile A and plan B view of an alternate embodiment of the present invention. In select embodiments of the present invention, this installation is used to dewater a crawlspace using an array 107 of vertically installed canister anodes 202. In select embodiments of the present invention, these canister anodes 202 may be of the variety commonly installed in deep well cathodic protection systems. Preferably, the canister anodes 202 are buried at the nodes of a grid 107 in which grid spacing is approximately one meter (3ft.) and d equals approximately 7.6 cm (3 in.) as depicted in the expanded portion 201 of FIG. 2. In select embodiments of the present invention, using either of the above described embodiments of FIGS. 1 and 2, the concentration of anode electrodes 102, 202 is densest preferably at the perimeter of the foundation 103.

Figure 3:
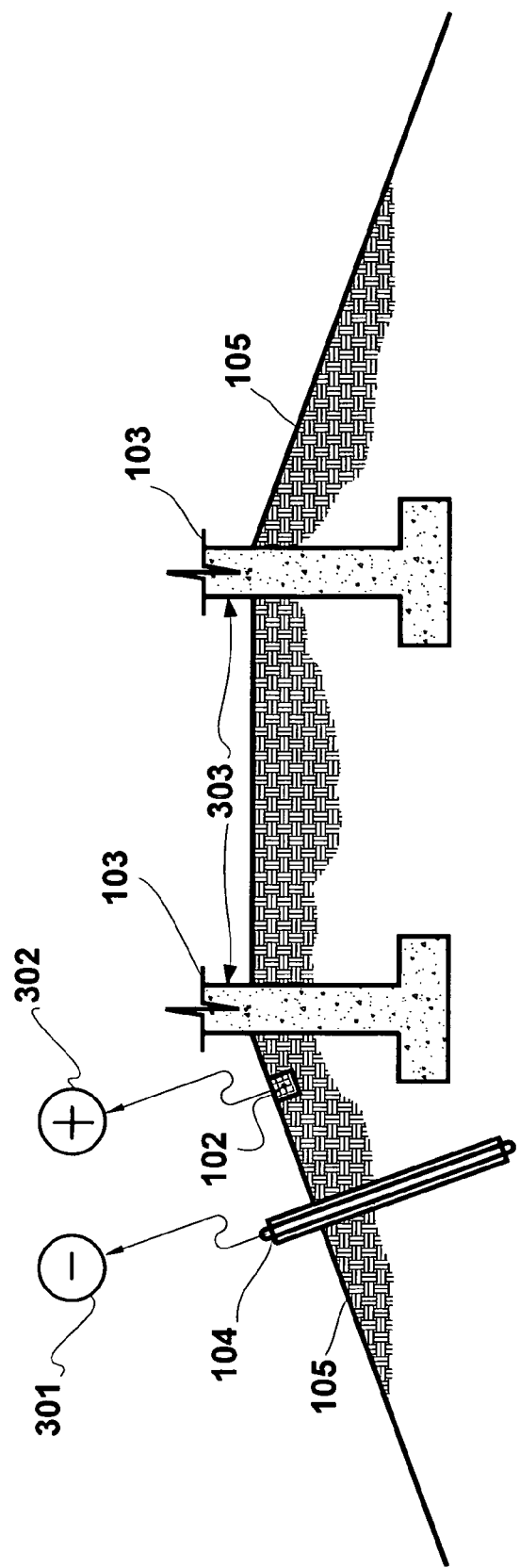
FIG. 3 is an alternate configuration to FIG. 1, arranging both cathodes and anodes outside the foundation, as used in select embodiments of the present invention.

Refer to FIG. 3 illustrating an alternate embodiment of the present invention in which both the anode electrode 102 and cathode electrode 104 are embedded in the soil 105 outside the building foundation 103 and crawl space 303. Directional drilling may be used to install both the anode electrodes 102 and the cathode electrodes 104. The cathode electrode 104 is depicted in communication with the negative side 301 of a DC power supply 501 and the anode electrode 102 in communication with the positive side 302 of the same DC power supply 501.

Figure 4:
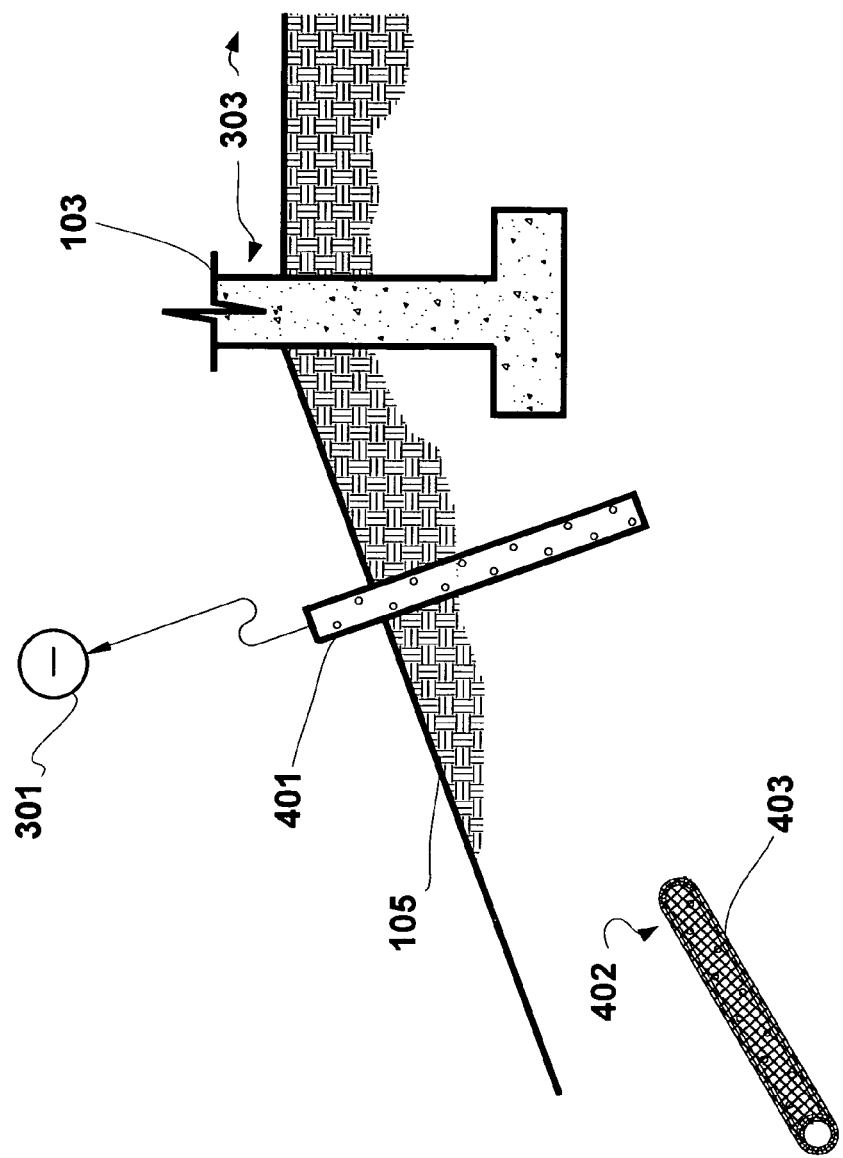
FIG. 4 depicts the use of alternate cathode electrodes that also serve as drainage devices.

Refer to FIG. 4 illustrating another embodiment of the present invention, a perforated metal, preferably copper, pipe 401 is employed simultaneously as a cathode and a drain. The pipe 401 may be connected to a conventional gravity drainage network or a pumping system, or both (not shown separately), to handle collected fluids. The pipe 401 may also be covered as indicated by the covered pipe 402 with a water permeable geotextile mat 403 to prevent clogging of the pores.

Figure 5:
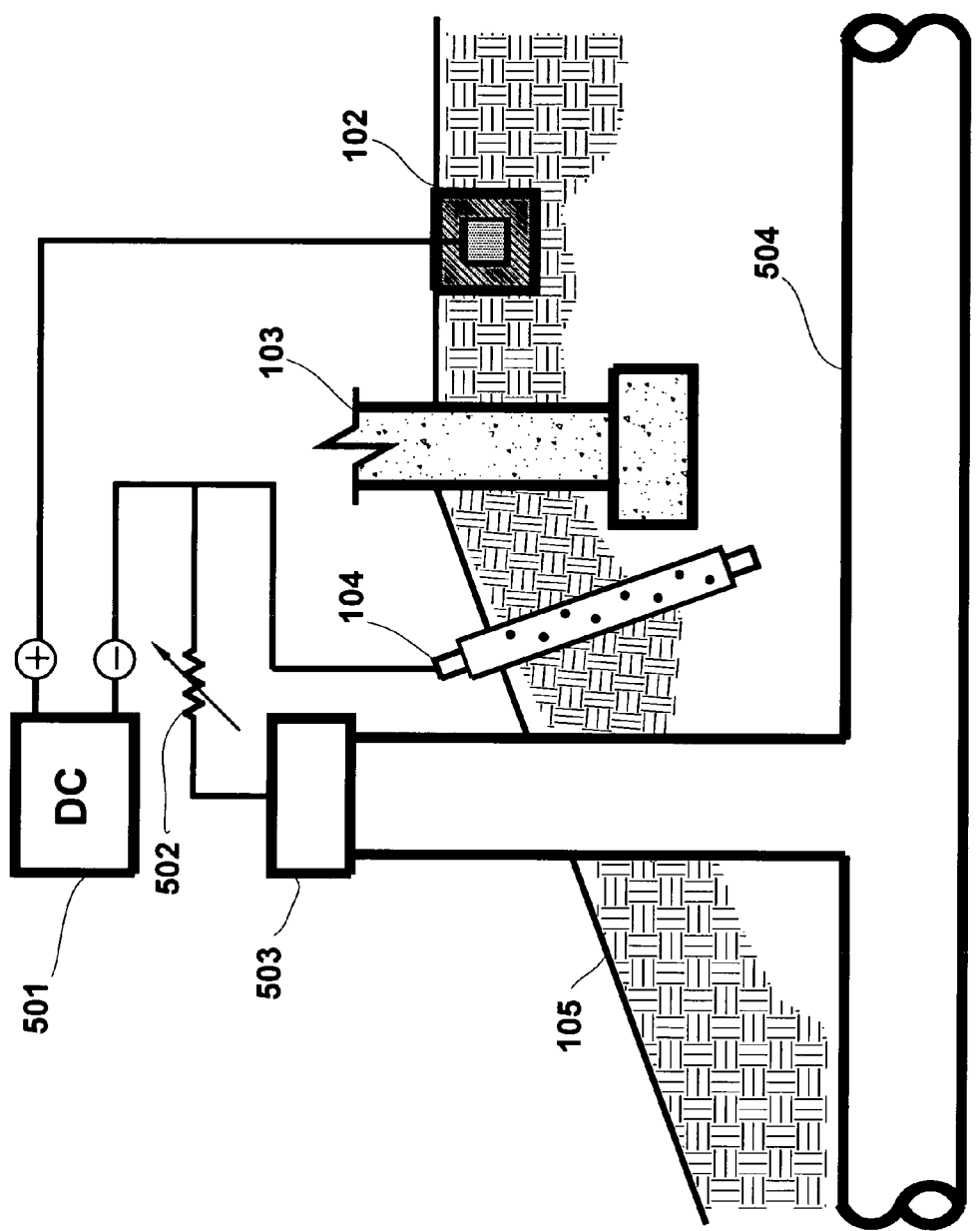
FIG. 5 illustrates the use of protective circuitry for metallic objects buried in proximity to the configuration of FIG. 1.

Refer to FIG. 5 illustrating an embodiment of the present invention that incorporates circuitry that reduces the opportunity for corrosion of metallic objects buried nearby. This configuration is arranged to direct the flow of current starting from the anode electrode 102 and flowing through the soil 105 to both the cathode electrode 104 and the buried structure 503, 504. Both coated and uncoated metallic objects are connected in this manner. These buried objects may include water pipes, gas lines, shoring and piling structures, buried storage tanks and the like. Each of these buried metallic objects, as illustrated by the piping 503, 504 is connected in parallel to a DC power supply 501 in series with individual adjustable resistors (rheostats) 502. This arrangement is employed to balance the cathodic current delivered to each of the connected buried metallic objects. This reduces the potential for buried metallic objects to corrode, shielding them from stray current effects.

In select embodiments of the present invention, a system is provided for de-watering manmade structure adjacent the perimeter of natural structure at least part of which comprises bedrock. This system comprises one or more channels in the natural structure; one or more conducting screens comprising durable dimensionally stable anodes embedded in the manmade structure; one or more conducting screens comprising a cathode installed adjacent the natural structure such that at least part of the conducting screen comprising a cathode is installed adjacent the channels; and circuitry communicating with the anode screens and cathode screens such that the circuitry facilitates establishing a voltage differential between the anode screens and the cathode screens. Select embodiments employ a pre-specified pulse train of DC voltage pulses to migrate water from the manmade structure while moving available cations in the manmade structure.

Select embodiments of the present invention incorporate one or more pipes that drain fluid from the channels.

In select embodiments of the present invention, one or more of the anode screens comprise ceramic coated wires. In select embodiments of the present invention, one or more anode screens are embedded in cementitious material within the manmade structure. In select embodiments of the present invention, the cementitious material is a dry mix concrete blown in place by compressed air with water added at the point of disbursal, such as Gunite.

In select embodiments of the present invention, one or more DC power supplies communicate with the circuitry connected to the screens.

In select embodiments of the present invention, a method is provided for de-watering manmade structure adjacent the perimeter of natural structure at least part of which comprises bedrock. The method comprises performing a resistivity test on the natural structure; providing one or more channels in the natural structure; attaching one or more conducting screens comprising durable dimensionally stable anodes to the manmade structure; installing one or more conducting screens comprising cathodes adjacent the natural structure such that at least part of the conducting screen comprising cathodes is installed adjacent the channels and providing circuitry communicating with the anode screens and cathode screens such that the circuitry facilitates establishing a voltage differential between the anode screens and cathode screens; and energizing the circuitry to establish a voltage differential between the anode screens and cathode screens.

In select embodiments of the present invention, the immediately above method provides for installing one or more pipes to facilitate draining fluid from the channels.

In select embodiments of the present invention, the immediately above method provides anode screens comprised of ceramic coated wires.

In select embodiments of the present invention, the immediately above method embeds anode screens in cementitious material within the manmade structure. In select embodiments of the present invention, the cementitious material is provided as a dry mix concrete blown in place by compressed air with water added at the point of disbursal, such as Gunite.

In select embodiments of the present invention, the immediately above method provides one or more DC power supplies communicating with the circuitry.

Figure 6:
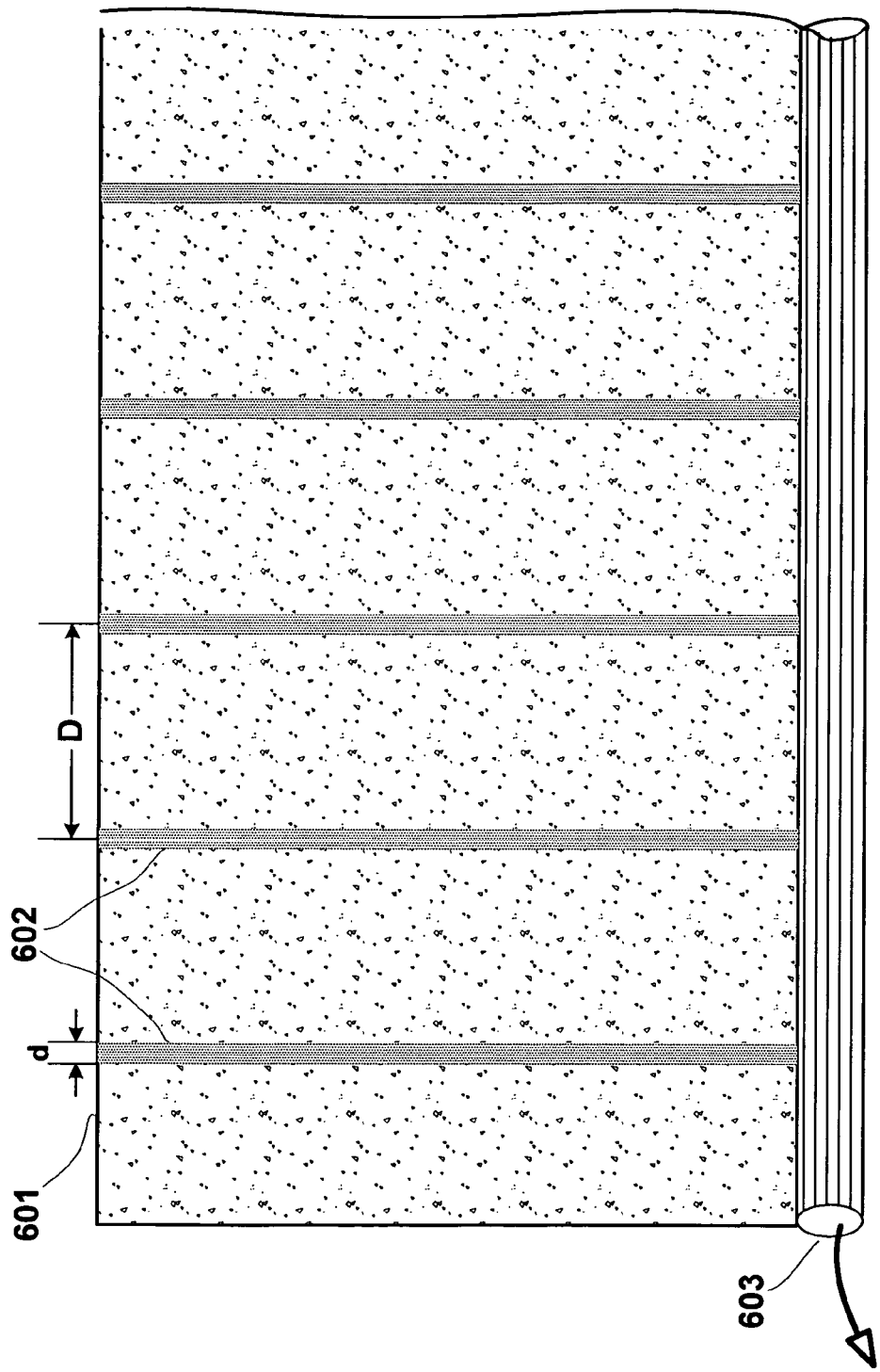
FIG. 6 shows the channels and pipe used in an installation of the present invention that is suitable for protecting a manmade structure built adjacent to bedrock.

Refer to FIG. 6 depicting initial stages of work for installing an alternate embodiment of the present invention in bedrock 601. Shallow grooves 602 of several centimeters (a few inches) in diameter, d, typically approximately 2.5-5.0 cm (one to two in.), are drilled in the bedrock at intervals, D, of about 45-60 cm (18-30 in.) on center using directional drilling techniques known in the art. A metal pipe 603, typically copper, of appropriate diameter, nominally about 15 cm (six in.) diameter, is emplaced for the additional purpose of catching drainage from the grooves 602.

Figure 7:
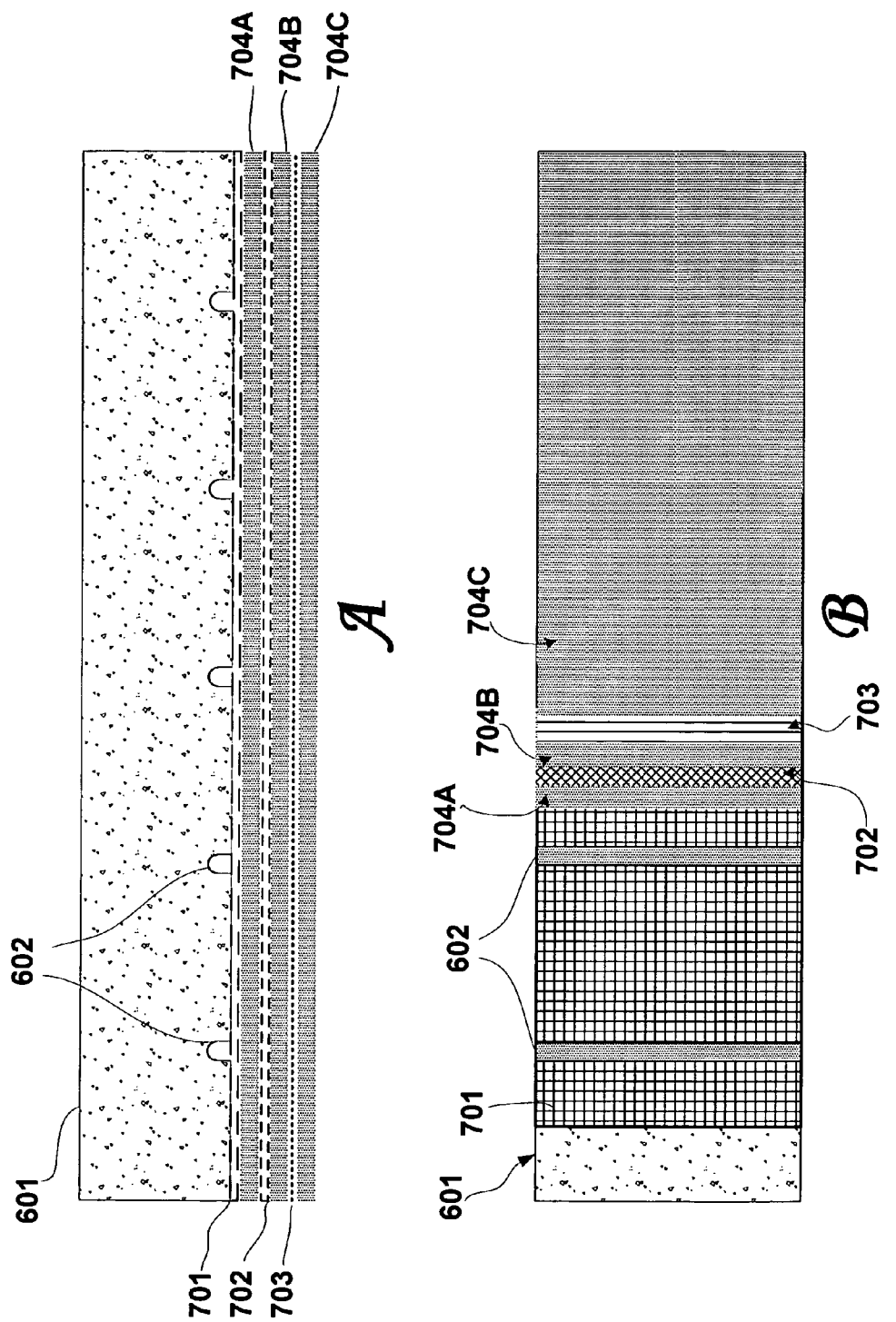
FIG. 7 shows an embodiment of the present invention that is suitable to protect a manmade structure built adjacent the natural structure depicted in FIG. 6.

Refer to FIG. 7 depicting plan A and elevation B views of an installation of an embodiment of the present invention in bed rock 601. In the plan view A, after the grooves 602 are formed in the bedrock 601, a wire mesh screen 701, preferably of copper or similar good corrosion resistant conductor, is emplaced as a cathode and suitably connected to the negative side of a DC power source (not shown separately in FIG. 7), typically operating at less than about 50 volts DC and preferably about 24 V DC. Over the cathode screen, a first layer of cementitious material 704A, such as a dry mix concrete blown in place by compressed air with water added at the point of disbursal, e.g., Gunite or the like, is emplaced. On top of this first layer 704A is emplaced another screen 702, the anode, typically comprising a durable dimensionally stable material as described above. The anode screen 702 is suitably connected to the positive side of the DC power source. A second layer 704B of cementitious material, is emplaced over the anode screen 702. On top of the second layer 704B is emplaced a vapor barrier 703, such as a metal foil. A final layer 704C of cementitious material completes the installation. This installation is particularly well suited to protect dams and other large concrete structures built over or on bedrock 601. The concept of operation is similar to that described above for de-watering crawl spaces, replacing wires with screens 701, 702 and holding the screens in place between layers 704A, B of cementitious materials. A top "vapor barrier" 703 precludes entry of water into the installation.

Although specific types of electro-osmotic configurations are discussed, other similar configurations or methods, including those that may have only some of the constituents or steps used in the above examples, may be suitable for dehydrating soil while reducing the opportunity for corrosion of nearby buried metallic objects and thus fall within the ambit of a preferred embodiment of the present invention as provided in the claims herein.

Accordingly, all such modifications are intended to be included within the scope of this invention as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract of the disclosure is provided to comply with the rules requiring an abstract that will allow a searcher to quickly ascertain the subject matter of the technical disclosure of any patent issued from this disclosure. 37 CFR §1.72

(b). Any advantages and benefits described may not apply to all embodiments of the invention.

We claim:

1. A system for de-watering manmade structure adjacent natural structure at least part of which comprises bedrock, comprising:
   at least one channel bored in said natural structure, said at least one channel with a slope having a vertical component much greater than a horizontal component;
   at least one pipe in operable communication with a bottommost portion of at least one said channel, said at least one pipe installed with a slope having a horizontal component much greater than a vertical component,
   wherein said pipe facilitates draining fluid from said at least one channel;
   at least one first conducting screen comprising a grid of durable dimensionally stable anodes, said at least one first conducting screen in operable communication with said manmade structure;
   at least one first layer of cementitious material in operable communication with and at least covering said at least one first conducting screen;
   at least one second conducting screen comprising a cathode installed in operable communication with said natural structure,
   at least one second layer of cementitious material in operable communication with and at least covering said at least one second conducting screen;
   wherein at least part of said at least one second conducting screen is installed adjacent said at least one channel; and
   circuitry in operable communication with at least said at least one first conducting screen and said at least one second conducting screen,
   wherein said circuitry facilitates establishing a voltage differential between said at least one first conducting screen and said at least one second conducting screen;
   at least one moisture barrier in operable communication with and covering said second layer of cementitious material; and
   at least one third layer of cementitious material in operable communication with and at least covering said at least one moisture barrier.

2. The system of claim 1 said at least one pipe in operable communication with each said at least one channel, wherein said at least one pipe facilitates draining fluid from said at least one channel.

3. The system of claim 1 in which said at least one first conducting screen comprises at least in part ceramic coated wires.

4. The system of claim 1 in which said at least one first conducting screen is embedded in cementitious material within said manmade structure concurrent with construction of said manmade structure.

5. The system of claim 1 in which said cementitious material is a dry mix concrete blown in place by compressed air with water added at the point of disbursal.

6. The system of claim 1 further comprising at least one DC power supply in operable communication with at least said circuitry.

7. A method for de-watering manmade structure adjacent natural structure at least part of which comprises bedrock, comprising:
   performing a resistivity test on said natural structure;
   providing at least one channel in said natural structure, said at least one channel with a slope having a vertical component much greater than a horizontal component;
   wherein said resistivity test at least provides data permitting determination of the number, spacing and size of said at least one channel;
   attaching at least one first conducting screen comprising a grid of durable dimensionally stable anodes to said manmade structure;
   providing at least one first layer of cementitious material in operable communication with and at least covering said at least one first conducting screen;
   installing at least one second conducting screen comprising a cathode in operable communication with said natural structure,
   wherein at least part of said second conducting screen is installed adjacent said at least one channel;
   providing at least one second layer of cementitious material in operable communication with and at least covering said at least one second conducting screen;
   providing at least one moisture barrier in operable communication with and covering said second layer of cementitious material;
   providing at least one third layer of cementitious material in operable communication with and at least covering said at least one moisture barrier;
   providing circuitry in operable communication with at least said at least one first conducting screen and said at least one second conducting screen,
   wherein said circuitry facilitates establishing a voltage differential between said at least one first conducting screen and said at least one second conducting screen; and
   energizing said circuitry to establish a voltage differential between said first and second conducting screens.

8. The method of claim 7 further providing at least one pipe in operable communication with said at least one channel, said at least one pipe installed with a slope having a horizontal component much greater than a vertical component, wherein said pipe facilitates draining fluid from said at least one channel.

9. The method of claim 7 providing said at least one first conducting screen comprised at least in part of ceramic coated wires.

10. The method of claim 7 embedding said at least one first conducting screen in cementitious material within said manmade structure concurrent with construction of said manmade structure.

11. The method of claim 7 providing said cementitious material as a dry mix concrete blown in place by compressed air with water added at the point of disbursal.

12. The method of claim 7 providing at least one DC power supply in operable communication with at least said circuitry.

* * * * *